Dec. 2, 1941.      A. THOMSON      2,264,815

HOSE COUPLING

Filed Nov. 5, 1940

INVENTOR
ALECANDER THOMSON

BY

*Ely & Frye*

ATTORNEYS

Patented Dec. 2, 1941

2,264,815

UNITED STATES PATENT OFFICE 2,264,815

HOSE COUPLING

Alecander Thomson, Akron, Ohio

Application November 5, 1940, Serial No. 364,407

2 Claims. (Cl. 285—80)

This invention relates to improvements in a hose coupling whereby a satisfactory seal is obtained between the members coupled together without the use of conventional clamps or other securing means.

An object of the invention is to provide novel means for quickly and efficiently coupling a flexible hose to metallic pipe or other rigid structure, or to another piece of hose.

Another object is to provide a coupling which will be strong, neat in appearance, and simple of construction.

A further object is to provide a novel method of coupling hose to another member.

Other objects and advantages will become apparent from the following description taken in conjunction with the accompanying drawing.

Figure 1:
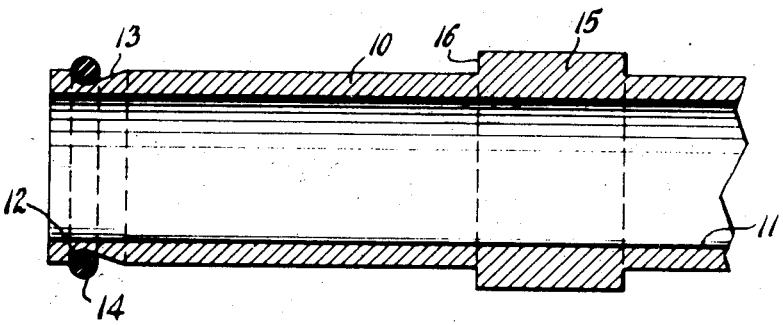
Fig. 1 is a broken sectional view through a piece of metallic pipe or other member to which the hose is to be coupled.
Figure 2:
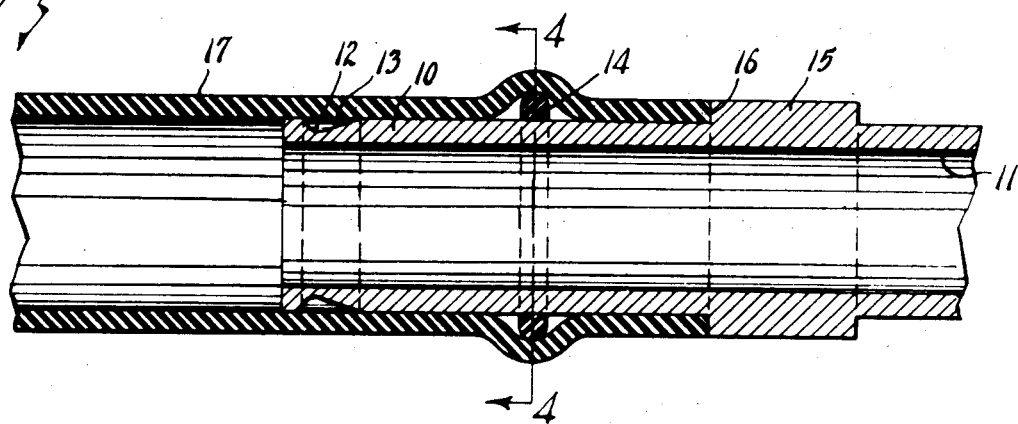
Fig. 2 is a similar view showing the hose joined to the pipe or other member.
Figure 4:
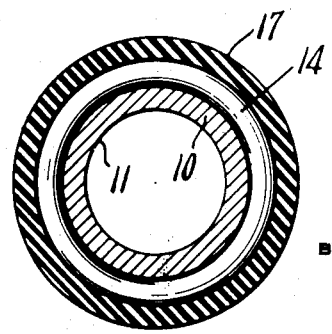
Fig. 4 is a vertical section taken substantially on line 4—4 of Fig. 2.

Referring to the embodiment shown in Figs. 1, 2 and 4, the numeral 10 indicates a member to which a piece of hose is to be coupled. In this instance member 10 comprises a piece of metallic pipe having a longitudinal opening 11 therethrough, but this member could be another piece of hose.

Adjacent one end, member 10 is provided on its outer surface with a groove 12 which tapers as shown at 13 and decreases in depth in a direction away from the end of the member. Groove 12 is adapted to receive a flexible ring 14 formed of rubber or other suitable flexible material, which ring is of sufficient thickness to extend beyond the outer surface of member 10. In this instance about half the thickness of ring 14 extends beyond member 10, but this may be varied according to the material used and the flexibility of the hose. Preferably, but not necessarily, a collar 15 is formed on member 10 so as to provide a shoulder 16 which will engage the end of the hose to be joined to member 10 and limit the movement of the hose as shown in Figs. 2 and 3.

Referring to Fig. 2, hose 17 has been forced over the end of member 10, even though the latter has an outside diameter at least equal to the inside diameter of the hose, and as the hose is pushed toward shoulder 16, the hose frictionally engages ring 14 and causes the latter to move up the tapered portion of groove 12 and onto the outer surface of member 10. As soon as ring 14 gets on the outer surface of member 10 it forms a seal between the hose and member 10, which seal will prevent leakage unless very high pressure fluid is being passed through the joint. Preferably, but not necessarily the hose is forced on member 10 until it engages shoulder 16 so that a substantial amount of the hose will be overlapping member 10.

Thus a coupling is provided which is strong, neat and simple, and is entirely satisfactory for many uses, among which may be noted, use in the cooling system of internal combustion engines and in garden hose. It should be noted that no exterior clamping means of any kind is used to hold the hose and member 10 together, the frictional engagement between the ring 14 and the two members joined together being sufficient for all ordinary purposes. In fact, it has been found that the outer surface of member 10 may even be irregular, such as would be found on a casting, and the seal is not affected by such irregularity.

Figure 3:
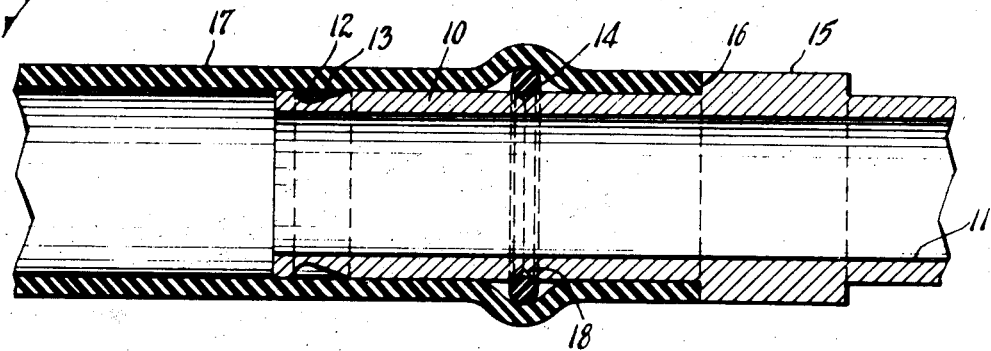
Fig. 3 is a similar view showing a modified embodiment of the invention.

In the modified embodiment shown in Fig. 3, an even stronger coupling is provided by forming a small groove 18 in the outer surface of member 10. This groove is not as deep as groove 12 and allows ring 14 to anchor itself in the groove in the manner shown in Fig. 3.

In disconnecting the coupled members it is only necessary to pull hard enough to remove the hose from member 10, and in so doing, ring 14 will return to groove 12, making it easier to remove the hose after the ring has returned to groove 12.

While I have illustrated and described the preferred embodiments of my invention, it will be apparent that changes and modifications may be resorted to without departing from the spirit of the invention or from the scope of the subjoined claims.

What is claimed is:

1. The combination of a tubular member and a flexible hose adapted to be connected thereto, said tubular member having a groove in its outer surface adjacent one end thereof, and a distortable ring adapted to be placed in said groove, said ring being movable by rolling action out of said groove onto the outer surface of said tubular member by frictional engagement with the inner surface of said hose when the latter is forced over said tubular member.

2. The combination of a tubular member and a flexible hose adapted to be connected thereto, said tubular member having a tapered groove in its outer surface adjacent one end thereof, and a ring of rubber-like material adapted to be placed in said groove, said ring being movable by rolling action out of said groove by frictional engagement with the inner surface of said hose to a position between said hose and said tubular member when the hose is forced over said tubular member.

ALECANDER THOMSON